Dec. 27, 1932.  L. SCHOTTGEN  1,892,519
TRANSPORTING MEANS FOR LIQUIDS
Filed April 5, 1930   2 Sheets-Sheet 1
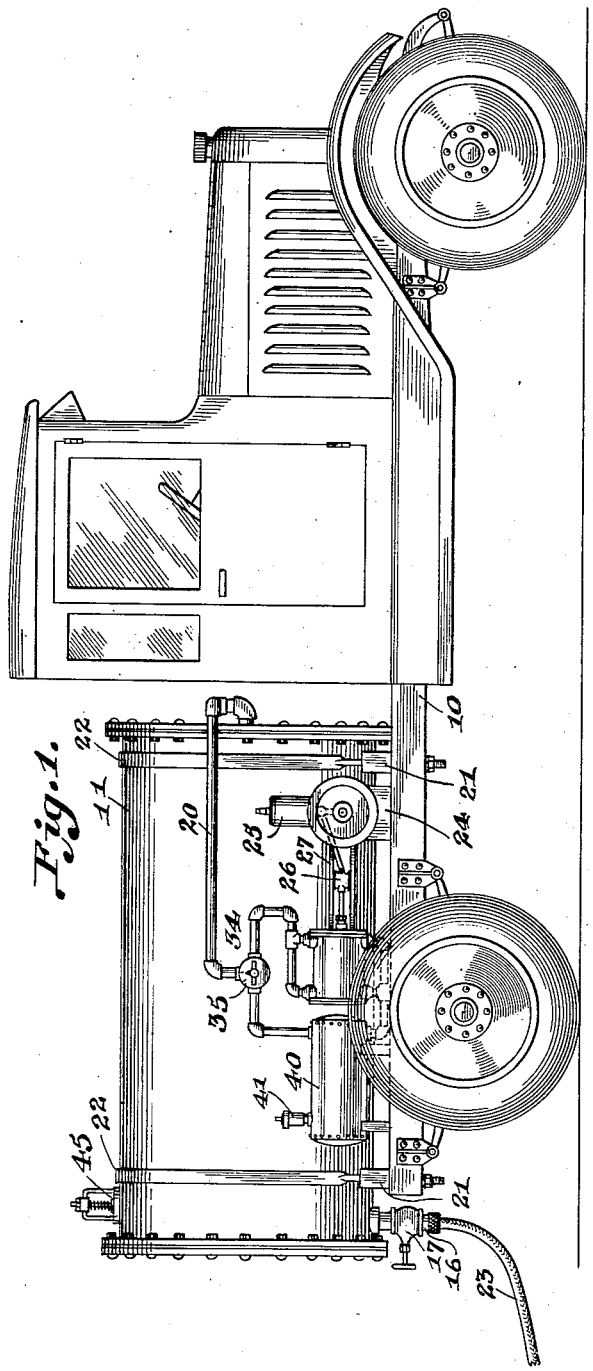
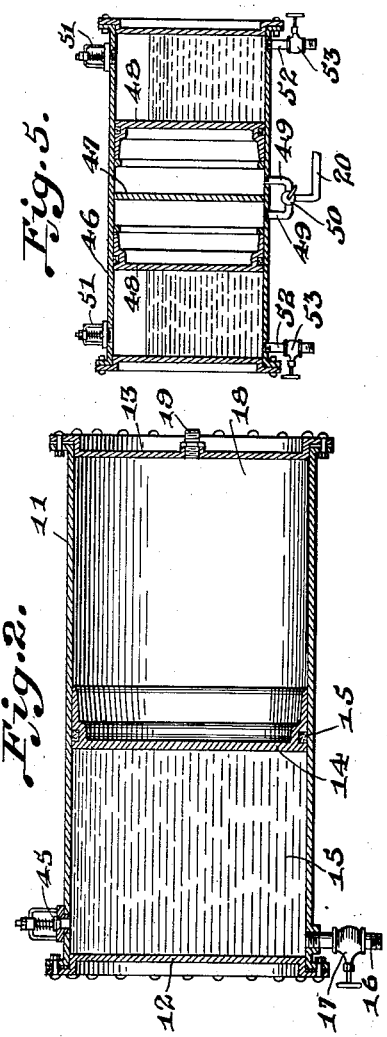
Inventor
Louis Schottgen
By C. P. Gorpel
Attorney

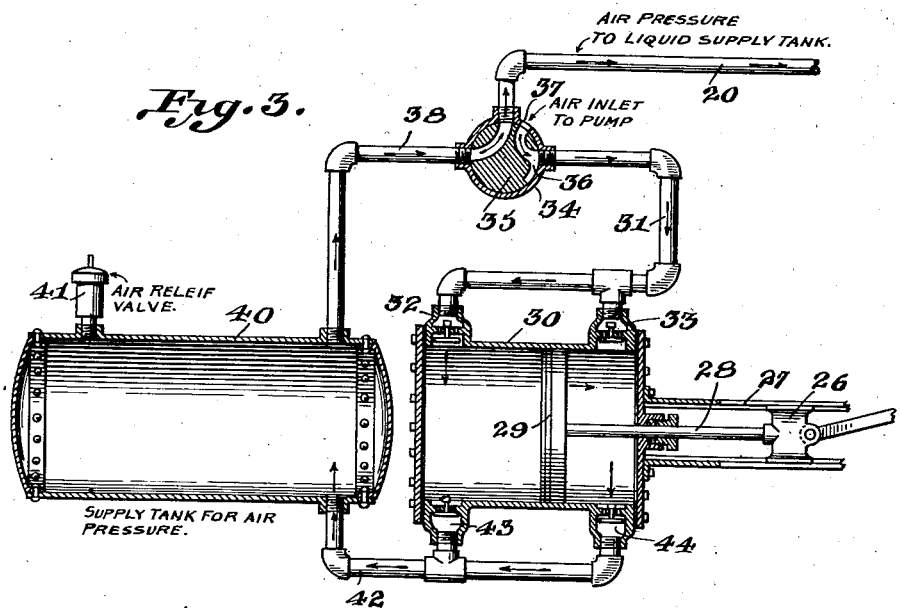
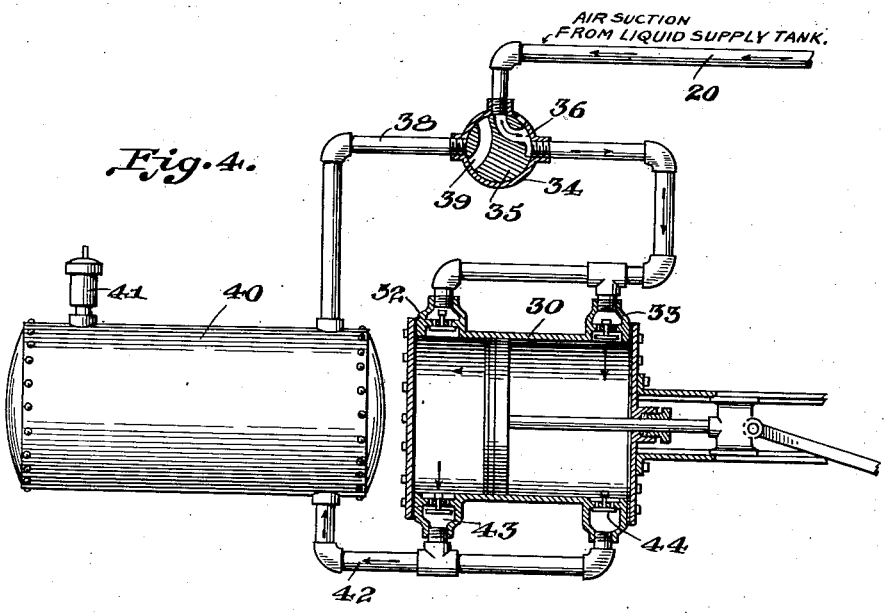

Patented Dec. 27, 1932

1,892,519

UNITED STATES PATENT OFFICE

LOUIS SCHOTTGEN, OF PORT MURRAY, NEW JERSEY

TRANSPORTING MEANS FOR LIQUIDS

Application filed April 5, 1930. Serial No. 441,854.

The present invention relates to transporting means for liquids and has for an object to provide means applicable to wagons, trucks, tank cars and the like for carrying liquid in bulk.

An object of the present invention is to provide means for carrying various amounts of liquid without agitating the same during transit and which will hold the liquid from movement or splashing in the tank or container so as not to injure the liquid, particularly milk or liquids charged with gas or the like, and to provide means for filling and emptying the tank or container without agitating the liquid to any appreciable extent.

The invention also aims at the provision of means which may be mounted upon the vehicle or car for effecting the filling of the tank, the stabilizing of the liquid therein, and the discharge of the liquid from the tank by air pressure and suction, and to provide a single manual means for optionally actuating the air pressure or suction means to quickly and easily accomplish the result during the filling and discharge of the tank.

The invention further aims at the provision of means of this character wherein pumps and other devices are unnecessary for the loading of the tank or the removal of the liquid therefrom, and wherein the tank is provided with one or more walls capable of receding or advancing with respect to the interior of the tank to gradually and gently draw the liquid into the tank when filling and for gradually and gently forcing the liquid out of the tank when unloading.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of a tank truck constructed in accordance with the present invention.

Figure 2 is a longitudinal section taken through a tank constructed in accordance with the present invention.

Figure 3 is an enlarged detail sectional view taken through the combined air pressure and suction device employed, the parts being shown in position of adjustment to supply air under pressure to the air compartment of the transportation tank.

Figure 4 is a like view with the parts adjusted for creating a suction in the air compartment of the transportation tank, and Figure 5 is a longitudinal section taken through a slightly modified form of the transportation tank.

Referring to the drawings, 10 designates a vehicle which may be of any suitable construction and which in the present instance is shown in the form of a motor truck. It is understood that the invention may be equally applied to tank cars or to tank vessels or other vehicles of transportation.

Mounted on the vehicle 10 is a transportation tank 11 which, as shown in Figure 2, is provided with opposite end heads 12 and 13 and which is divided into opposite end compartments or chambers by a piston 14. The piston 14 is provided with a suitable packing 15' or the like adapted to seal the opposite ends of the tank 11 from each other. The tank 11 at one side of the piston 14 provides a liquid compartment or chamber 15 which, according to the arrangement shown in Figure 1, is preferably toward the rear end portion of the tank 11, and the bottom of the tank 11 is provided near its rear end with a nipple 16 provided with a valve 17 for controlling the flow of liquid into and out of the compartment 15.

The forward end of the tank 11 comprises an air compartment or chamber 18 and the head 13 at the forward end of the tank 11 is provided with a nipple 19 to which is connected an air pipe 20 which extends to a combined suction and pressure device, shown particularly in Figures 3 and 4.

The tank 11 may be mounted upon the truck frame 10 in any suitable manner, and in the present instance pillow blocks 21 are secured crosswise on the frame 10 beneath the front and rear portions of the tank 11, and the latter is held seated in the blocks 21 by bands or straps 22 as shown. The rear end of the tank 11 extends beyond the frame 10 to accommodate a flexible hose 23 or the like which is attached to the nipple 16 for conducting the liquid to and from the rear compartment of the tank.

The vehicle frame 10 may also serve as a support for carrying the combined pressure and suction device as a part of the tank 11, and in the present instance the mechanism is shown as mounted upon suitable blocks 24 shaped and arranged to accommodate the various parts of the mechanism. An engine or motor 25 is mounted on the frame 10 and is connected to a crosshead 26 operating in guides 27 and connected to the outer end of a piston rod 28 having a piston 29 mounted to reciprocate in a pump cylinder 30.

The pump cylinder 30 is preferably disposed rearwardly of the engine or motor 25 and is provided at its upper side with a suction pipe 31 having connection with the inwardly opening valves 32 and 33 of the cylinder 30, the valves 32 and 33 being disposed at opposite ends of the cylinder 30.

The outer end of the pipe 31 is connected to a valve casing 34 having a turning plug 35 therein provided with a port 36 adapted to register at one end with the pipe 31 and at its other end with an atmospheric air port 37 so that when the turning plug 35 is adjusted into the position shown in Figure 3 atmospheric air will be freely supplied to the pump cylinder 30.

The port 36 is provided with an elongated recess or opening at its end adjacent to the pipe 31 so that when the turning plug 35 is adjusted into the position shown in Figure 4 the pipe 31 will remain in communication with the port 36 while the other end of the port 36 is turned into register with the outer end of the air pipe 20 which is connected to the top of the valve casing 34.

The valve casing 34 is provided at preferably its rear side with an air pressure pipe 38 adapted to register with one end of a port 39 extending through the turning plug 35 and arranged at such angle that when the turning plug 35 is in the position shown in Figure 3 the pipe 38 will be in communication through the turning plug and through the air pipe 20 to supply air under pressure thereto.

The pipe 38 leads from an air supply tank 40 provided with a suitable air relief valve 41 and which is connected by a pressure pipe 42 to the lower side of the pump cylinder 30, the pipe 42 having communication with the valves 43 and 44 which open outwardly from the pump cylinder 30 and are disposed at opposite ends of the same.

For the purpose of venting all of the air out of the liquid compartment 15 of the tank, the latter may be provided with a valve 45 located in the upper wall of the tank 11 near the rear end thereof so that when the piston 14 is forced rearwardly to raise the liquid level of the contents of the compartment or chamber 15, the air may be advanced out through the top of the compartment so that the latter may be completely filled with the liquid to prevent the shaking, splashing or agitation thereof.

Referring now to Figure 5, the modification shows a transportation tank 46 having an intermediate fixed partition 47 dividing the tank into opposite end sections, and each section is provided with a piston 48, the pistons adapted for operation to and from the partition 47.

The air pipe 20 leads from the valve casing 34, such as shown in Figure 1, to a suitable point intermediate the opposite ends of the transportation tank 46 and is connected by branch pipes 49, and a suitable two-way valve 50, to the interior of the tank 46 at opposite sides of the partition 47. The tank 46 is provided at its opposite ends with relief valves 51 so that the opposite sections of the tank 46 may each be independently operated in the same manner as is the operation of the structure shown in Figure 2.

The advantage of the sectional tank is that liquids of different grades or different characters may be carried in the different sections of the tank and be handled independently. Of course these sections of the tank may be of predetermined capacity so that each section serves as a measuring vessel or container to handle predetermined quantities of liquid.

In the structure shown in Figure 5 there is provided independent nipples 52 having independent valves 53 and adapted to receive, either one at a time or simultaneously, one or more flexible pipes such as shown at 23 in Figure 1. This admits of either the separate or simultaneous operation of the pistons 48 for filling, emptying or stabilizing the fluid.

In operation, and referring to Figures 1 to 4, when it is desired to transport a quantity of liquid by means of the present invention it is only necessary to insert the free end of the hose 23 in a container, storage tank or the like, adjust the valve 35 into the position shown in Figure 4 and start the operation of the pump. As the suction side of the pump is connected through the valve 35 with the air pipe 20, air is withdrawn from the air chamber or compartment 18 and the piston 14 is moved toward the head 13. The result is that the chamber 15 is expanded or increased in size and a suction is created upwardly through the nipple 16, the valve 17 being open, so that the liquid is raised through the pipe 23 into the chamber 15.

When the desired amount of liquid is drawn into the tank 11, the valve 35 is closed, and the valve 17 is closed so as to maintain the liquid in the compartment 15. The valve 35 is now adjusted into an opposite position, such as shown in Figure 3, whereupon the air under pressure in the tank 40 is directed through the valve 35 into the air pipe 20 and into the air compartment 18. The pressure of the air against the piston 14 moves the latter toward the rear head 12 and raises the surface level of the liquid in the compartment 15.

The rising liquid in the compartment compresses the air in the upper portion of the compartment and the air is forced out through the vent valve 45. The valve 45 may be of any adaptable character to operate only under excessive pressure so that when it is desired to eject the liquid from the compartment 15, the valve 45 will not be opened but the liquid will flow freely down through the hose 23 when the valve 17 is open. This discharge of the fluid is affected by adjusting the valve 35 to the position shown in Figure 3 while at the same time opening the valve 17.

When the valve 17 is not open then the compartment 15 will be reduced in size until the resistance of the liquid to further rise will either be indicated in the valve 45 or will automatically close the same and hold the piston 14 against further movement. Of course various relief valves may be provided in the tank or other parts of the system as may be found safe or desirable.

By use of this invention it will be noted that the liquid is not agitated by passage through a pump in loading the tank 11 nor is air admixed with the liquid and the liquid is maintained in a free flowing condition both in filling and discharging, and during transportation the liquid is held against shaking or agitation incident to the jarring or vibration of the vehicle.

It is obvious that various changes and modifications may be made in the details of construction and design of the above specifically described embodiments of this invention without departing from the spirit thereof, such changes and modifications being restricted only by the scope of the following claims:

What is claimed is:—

1. Transporting means for liquids comprising a tank, a flanged leakage proof piston mounted in the tank to provide liquid and air compartments, a valved nipple connected to the liquid compartment for the inlet and outlet of the liquid, an air relief valve connected to the liquid compartment to allow for the escape of gas from the liquids, an air pipe connected to the air compartment, a pump cylinder having inwardly opening valves at one side and outwardly opening valves at its opposite side, a suction pipe connected to the inwardly opening valves, a pressure pipe connected to the outwardly opening valves, a supply tank connected to the pressure pipe, and a manually operated two-way valve carried by the air pipe of the tank and connected at one side to the air supply tank and at its other side to said suction pipe, said valve having one of its ports always in communication with the inwardly opening valves of said pump cylinder, whereby said tank is adapted to retain liquids therein during transportation without any agitation.

2. The combination for transporting liquids without agitation consisting of a tank, a flanged piston in the tank separating the same into a compartment for liquid and another compartment for air and adapted to move to either end of the tank, a valved supply and discharge nipple for the liquid compartment, a relief valve on the tank at the liquid compartment for the escape of gas therefrom upon the compressing movement of the piston, and a combined compressed air and suction pipe with a manually controlled two-way valve, said pipe being connected with the air compartment of the tank for conducting air to or withdrawing the same from the air compartment to effect movement of the piston in the tank.

3. Apparatus for transporting liquids without agitating the same comprising a tank, a flanged leakage-proof piston slidable in the tank and dividing the same into a liquid and an air compartment respectively, a nipple in connection with said liquid compartment for the entrance and discharge of liquid upon movement of the piston, an air pipe in connection with the air compartment of the tank, a manually operated two-way valve on said pipe, a source of compressed air in communication with said valve and air compartment, and means in connection with the valve and in communication with the source of compressed air for causing movement of said piston, said valve adapted for operation to alternately establish pressure and suction in the air compartment of said tank to force the piston against the liquid therein to discharge the liquid therefrom or to move the piston into the air space for filling the liquid side of the tank.

4. In apparatus for transporting liquids without agitation thereof, the combination with a tank having an air relief valve and a nipple, a flanged piston separating the tank into two compartments, namely, for air and for liquid, of combined air pressure and suction means, and a manually controlled two-way valve intermediate the air compartment of the tank and said means for regulating the flow of air into and out of the tank whereby the piston is moved to force liquid from the tank or draw it thereinto, said relief valve being adapted to permit the escape of gases from the liquid compartment upon the sliding of the piston against the liquid in the tank.

In testimony that I claim the foregoing as my invention, I have signed my name hereto.

LOUIS SCHOTTGEN.